E. H. ANGIER.
TUBE.
APPLICATION FILED NOV. 13, 1914.
1,242,903.
Patented Oct. 16, 1917.
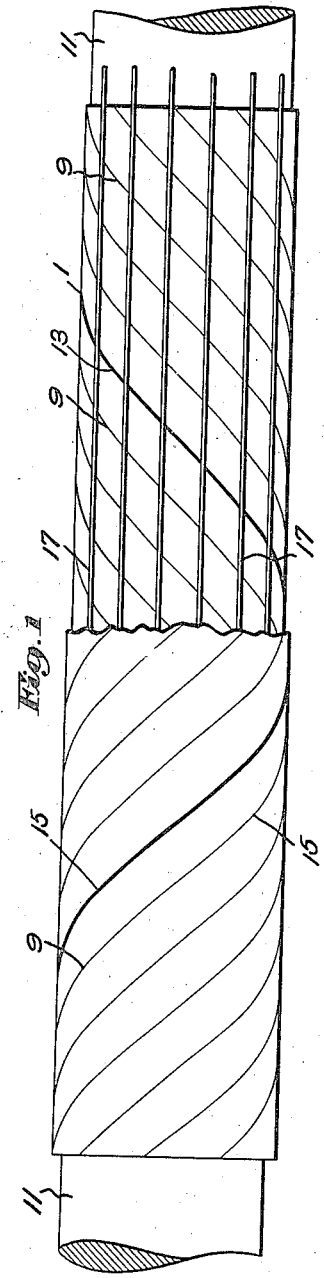
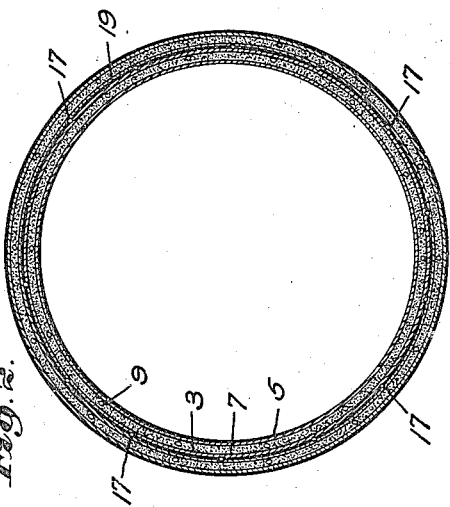
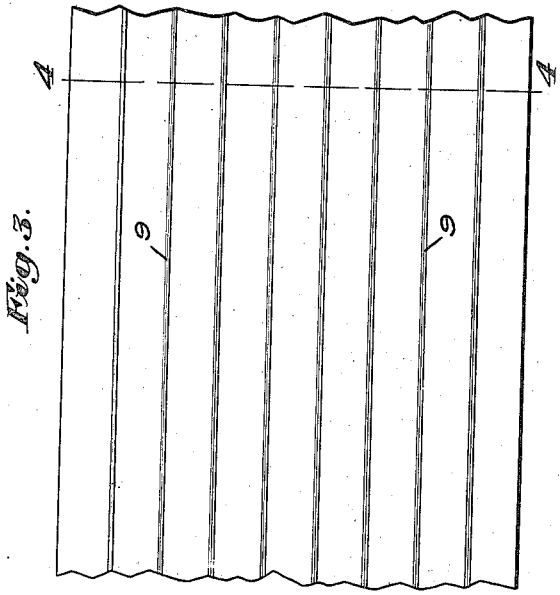
Witnesses:
Horace A. Crossman
Carl L. Choate.
Inventor:
Edward H. Angier,
by Emery, Booth, Janney & Varney
Attys.

UNITED STATES PATENT OFFICE.

EDWARD H. ANGIER, OF FRAMINGHAM, MASSACHUSETTS.

TUBE.

1,242,903. Specification of Letters Patent. Patented Oct. 16, 1917.

Application filed November 13, 1914. Serial No. 872,010.

*To all whom it may concern:*

Be it known that I, EDWARD H. ANGIER, a citizen of the United States, and a resident of Framingham, Massachusetts, have invented an Improvement in Tubes, of which the following description in connection with the accompanying drawings, is a specification, like characters on the drawings representing like parts.

This invention relates to tubes and aims to provide a strong and simple construction which may be employed for a variety of uses.

The character of the invention may be best understood by reference to the following description of an illustrative embodiment thereof shown in the accompanying drawing, wherein:

Figure 1 is a view partly in side elevation and partly broken away of an illustrative tube shown herein as embodying the invention;

Fig. 2 on an enlarged scale is a transverse section through the tube shown in Fig. 1;

Fig. 3 is a plan of sheet material which may be used in constructing the tube; and Fig. 4 is a section taken on line 4—4 of Fig. 3.

Referring to the drawing, the illustrative tube shown therein as embodying the invention comprises an inner layer 1 including strips 3 and 5 of paper or other appropriate material having a layer 7 of black asphaltum or other appropriate adhesive interposed between them. The black asphaltum is advantageous since it is water-proof and capable of flexion without cracking. To contribute to the strength of the layer, threads 9 may be introduced between the layers 3 and 5 and be embedded in the water-proof layer 7.

A layer formed as described may be wound in helical form on a mandrel 11. The strip is wound to present edges engaging along helical lines 13 and secured together by silicate of soda or other suitable adhesive.

A second layer similar in construction to the one just described may be superposed thereon. Preferably this layer is wound in an opposite direction from the first layer and consequently the lines 15 formed by the meeting edges of the strip will cross the helical lines 13 marking the juncture of the meeting edges of the first strip. The crossing of these lines is advantageous since it tends to prevent transverse rupture of the tube.

To further strengthen the tube there may be provided tension threads 17 distributed at intervals circumferentially of the tube and extending longitudinally thereof. As shown herein these threads are interposed between the outer and inner layers.

To secure the two layers in strong engagement with one another and to contribute to the strengthening of the tube as a whole, a layer 19 of silicate of soda or other appropriate adhesive may be interposed between said layers. The longitudinal tension threads 17 may be embedded in this adhesive layer.

Each layer as shown herein is of composite construction. There are advantages in using this constructiton, but in some cases the layer may be of a single strong sheet of paper or other appropriate material. While the layers are shown herein as helically wound, they may be spirally or otherwise wound as desired.

It will be understood that it is not indispensable that the longitudinal tension threads should be interposed between the outer and inner layers or that the helical wound strengthening threads be interposed between the strips of one layer since they may be variously disposed as desired. While two layers have been shown herein, obviously any number of layers may be employed according to the strength demanded by the use to which the tube is to be applied.

The tube as a whole may be dipped in an adhesive bath such, for example, as silicate of soda or asphaltum, or both, and thus will receive a coating layer both externally and internally thereof. If the coating layer is of asphaltum the tube will be fortified against the ingress of moisture both from within and from without.

A tube constructed as described may be employed for a variety of uses. Among others, it may be used as a mailing tube, as a form on which materials may be wound, as a container for various articles or materials, as a conduit for conducting gases or liquids. In large sizes the tube may be used in constructing columns of concrete. In such use, the tube would serve as a mold in which the concrete would be filled.

Having described one illustrative embodiment of the invention without limiting the same thereto, what I claim as new and desire to secure by Letters Patent is:

1. A tube comprising a plurality of layers, each comprising spirally-wound, ribbon-like strips 3, 5, an adhesive layer between said strips, and spirally-wound tension threads 9 in said adhesive layer; an adhesive layer 19 between said layers, and a waterproof coating for the entire tube.

2. A tube comprising oppositely wound spiral layers, each comprising ribbon-like strips 3, 5, a waterproof adhesive layer 7 between said strips, and tension threads 9 embedded in said adhesive layer; and an adhesive layer 19 between said layers.

3. A tube comprising a plurality of layers, each comprising spirally wound strips 3, 5, with a waterproof layer 7 between them, and an adhesive layer 19 between said first-named layers.

4. A tube comprising a plurality of layers, each comprising spirally wound strips 3, 5, with a waterproof layer 7 between them, and an adhesive layer 19 between said first-named layers having tension threads 17 therein.

In testimony whereof, I have signed my name to this specification, in the presence of two subscribing witnesses.

EDWARD H. ANGIER.

Witnesses:
ROBERT H. KAMMLER,
HENRY T. WILLIAMS.